US012249780B2

(12) United States Patent
Balakrishnan et al.

(10) Patent No.: US 12,249,780 B2
(45) Date of Patent: Mar. 11, 2025

(54) CARD EDGE CONNECTOR

(71) Applicant: TE Connectivity Solutions GmbH, Schaffhausen (CH)

(72) Inventors: Nitish Balakrishnan, Harrisburg, PA (US); Michael John Phillips, Camp Hill, PA (US); Charles Jameson Valentine, Lancaster, PA (US); Michael Eugene Shirk, Grantville, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 400 days.

(21) Appl. No.: 17/881,689

(22) Filed: Aug. 5, 2022

(65) Prior Publication Data

US 2023/0116615 A1 Apr. 13, 2023

Related U.S. Application Data

(60) Provisional application No. 63/253,513, filed on Oct. 7, 2021.

(51) Int. Cl.

| | |
|---|---|
| ***H01R 12/72*** | (2011.01) |
| ***H01R 12/70*** | (2011.01) |
| ***H01R 13/516*** | (2006.01) |
| ***H01R 13/627*** | (2006.01) |
| ***H01R 13/629*** | (2006.01) |
| ***H01R 13/6592*** | (2011.01) |
| ***H01R 31/08*** | (2006.01) |

(52) U.S. Cl.

CPC ....... *H01R 12/721* (2013.01); *H01R 12/7005* (2013.01); *H01R 13/516* (2013.01); *H01R 13/629* (2013.01); *H01R 13/6592* (2013.01); *H01R 13/6271* (2013.01); *H01R 31/085* (2013.01)

(58) Field of Classification Search

CPC ............. H01R 12/725; H01R 12/7005; H01R 13/516; H01R 13/629; H01R 13/6592; H01R 13/658; H01R 13/6271; H01R 2103/00; H01R 31/085

USPC ......................... 439/629, 579, 108, 497, 498

See application file for complete search history.

(56) References Cited

U.S. PATENT DOCUMENTS

| | | | | |
|---|---|---|---|---|
| 9,985,367 | B2 * | 5/2018 | Wanha | H01R 13/6461 |
| 10,535,956 | B2 * | 1/2020 | Henry | H01R 12/62 |
| 10,741,941 | B2 * | 8/2020 | Wu | H01R 43/0256 |
| 2021/0234291 | A1 * | 7/2021 | Zerebilov | H01R 12/75 |

* cited by examiner

*Primary Examiner* — Gary F Paumen

(57) ABSTRACT

A card edge connector includes a housing configured to be mounted to a host circuit board and having a card slot at the front configured to receive a card edge of a module circuit card of the pluggable module. A contact assembly is received in a cavity of the housing having cable contacts arranged in an upper contact set and lower contact set. An upper ground bus bar is electrically connected to terminating ends of the ground contacts of the upper contact set and a lower ground bus bar is electrically connected to the ground contacts of the lower contact set. A ground element is coupled to the upper ground bus bar or the lower ground bus bar and includes a board termination component configured to be terminated to the host circuit board to electrically connect the corresponding ground bus bar to the host circuit board.

20 Claims, 12 Drawing Sheets

CARD EDGE CONNECTOR

CROSS REFERENCE TO RELATED APPLICATIONS

This application claims benefit to U.S. Provisional Application No. 63/253,513, filed 7 Oct. 2021, titled "CARD EDGE CONNECTOR", the subject matter of which is herein incorporated by reference in its entirety.

BACKGROUND OF THE INVENTION

The subject matter herein relates generally to card edge connectors of communication systems.

Some communication systems utilize communication connectors, such as card edge connectors, mounted to a host circuit board to interconnect various components of the system for data communication. Some known communication systems use pluggable modules, such as I/O modules or circuit cards, which are electrically connected to the card edge connectors. The pluggable modules have module circuit cards having card edges that are mated with the card edge connectors during the mating operation. Each card edge connector typically has an upper row of contacts and a lower row of contact for mating with the corresponding circuit board. There is a need for connectors and circuit boards of communication systems to have greater contact density and/or data throughput. However, increasing density of contacts in the card edge connector leads to problems with cross-talk and signal integrity. Additionally, precise locating of high numbers of contacts in a connector is difficult. Moreover, at high speeds, signal degradation may occur along the signal paths through the host circuit board.

A need remains for a reliable card edge connector having high density and high data speed throughput.

BRIEF DESCRIPTION OF THE INVENTION

In one embodiment, a card edge connector for mating with a pluggable module is provided and includes a housing configured to be mounted to a host circuit board and having a card slot at the front configured to receive a card edge of a module circuit card of the pluggable module. A contact assembly is received in a cavity of the housing having cable contacts arranged in an upper contact set and lower contact set. An upper ground bus bar is electrically connected to terminating ends of the ground contacts of the upper contact set and a lower ground bus bar is electrically connected to the ground contacts of the lower contact set. A ground element is coupled to the upper ground bus bar or the lower ground bus bar and includes a board termination component configured to be terminated to the host circuit board to electrically connect the corresponding ground bus bar to the host circuit board.

In another embodiment, a card edge connector for mating with a pluggable module is provided and includes a housing including a top and a bottom. The housing has a front and a rear, a first side and a second side. The bottom is configured to be mounted to a host circuit board. The housing includes a cavity and a card slot at the front of the housing. The card slot is configured to receive a card edge of a module circuit card of the pluggable module. A card edge connector for mating with a pluggable module includes a contact assembly received in the cavity. The contact assembly has a plurality of cable contacts and a plurality of board contacts. The cable contacts are arranged in an upper contact set and lower contact set. The cable contacts include signal contacts arranged in pairs and ground contacts arranged between the pairs of the signal contacts. Each cable contact includes a mating end and a terminating end. The mating end is located in the card slot for mating with the module circuit card. The terminated ends of the signal contacts are configured to be terminated to signal conductors of cables. Each board contact includes a board mating end and a board terminating end. The board mating end is located in the card slot for mating with the module circuit card. The board terminating end is terminated to the host circuit board and the board contacts transmit low speed signals between the module circuit card and the host circuit board. The cable contacts transmit high speed signals between the module circuit card and the cables. The card edge connector includes an upper ground bus bar electrically connected to the terminating ends of each of the ground contacts of the upper contact set and a lower ground bus bar electrically connected to each of the ground contacts of the lower contact set. The card edge connector includes a ground element coupled to at least one of the upper ground bus bar and the lower ground bus bar. The ground element includes a board termination component configured to be terminated to the host circuit board. The ground element electrically connects the at least one of the upper ground bus bar and the lower ground bus bar to the host circuit board.

In a further embodiment, a communication system includes a host circuit board having a board surface and a mounting area on the board surface. The host circuit board includes board circuits at the mounting area. The communication system includes a card edge connector mounted to the host circuit board at the mounting area. The card edge connector includes a housing with a top and a bottom, a front and a rear. The housing has a first side and a second side. The bottom is mounted to the board surface of the host circuit board. The housing includes a cavity and a card slot at the front of the housing. The card slot is configured to receive a card edge of a module circuit card of a pluggable module. The card edge connector includes a contact assembly received in the cavity. The contact assembly has a plurality of cable contacts and a plurality of board contacts. The cable contacts are arranged in an upper contact set and lower contact set. The cable contacts include signal contacts arranged in pairs and ground contacts arranged between the pairs of the signal contacts. Each cable contact includes a mating end and a terminating end. The mating end is located in the card slot for mating with the module circuit card. The terminated ends of the signal contacts are configured to be terminated to signal conductors of cables. Each board contact includes a mating end and a board terminating end. The mating end is located in the card slot for mating with the module circuit card. The board terminating end is terminated to a corresponding one of the board circuits of the host circuit board. The board contacts transmit low speed signals between the module circuit card and the host circuit board, the cable contacts transmit high speed signals between the module circuit card and the cables. The card edge connector includes an upper ground bus bar electrically connected to the terminating ends of each of the ground contacts of the upper contact set and a lower ground bus bar electrically connected to each of the ground contacts of the lower contact set. The card edge connector includes a ground element coupled to at least one of the upper ground bus bar and the lower ground bus bar. The ground element has a board termination component terminated to the host circuit board at the mounting area. The ground element is electrically connecting the at least one of the upper ground bus bar and the lower ground bus bar to the host circuit board.

DETAILED DESCRIPTION OF THE INVENTION

Figure 1:
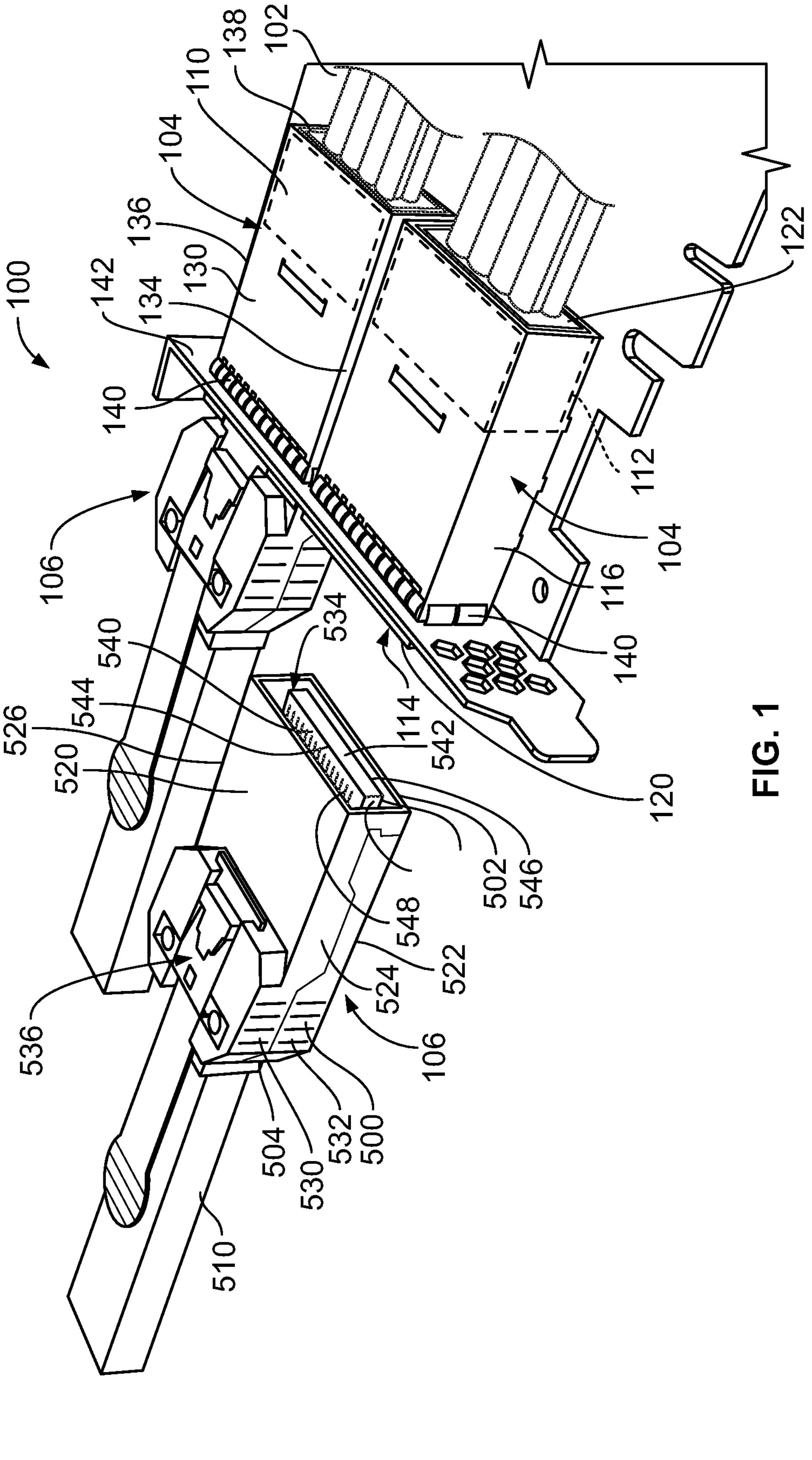
FIG. 1 is a front perspective view of a communication system formed in accordance with an exemplary embodiment.
Figure 2:
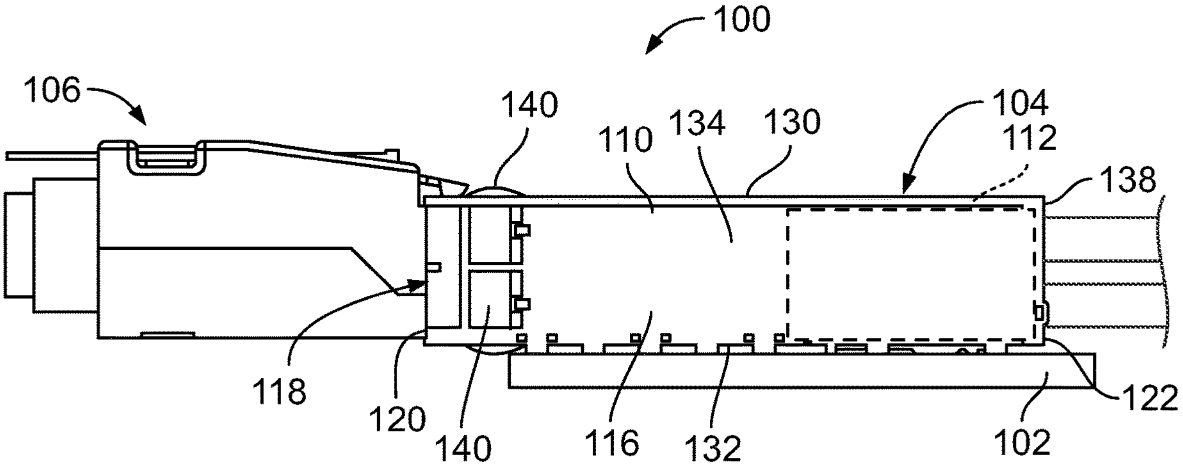
FIG. 2 is a side view of the communication system formed in accordance with an exemplary embodiment.
Figure 3:
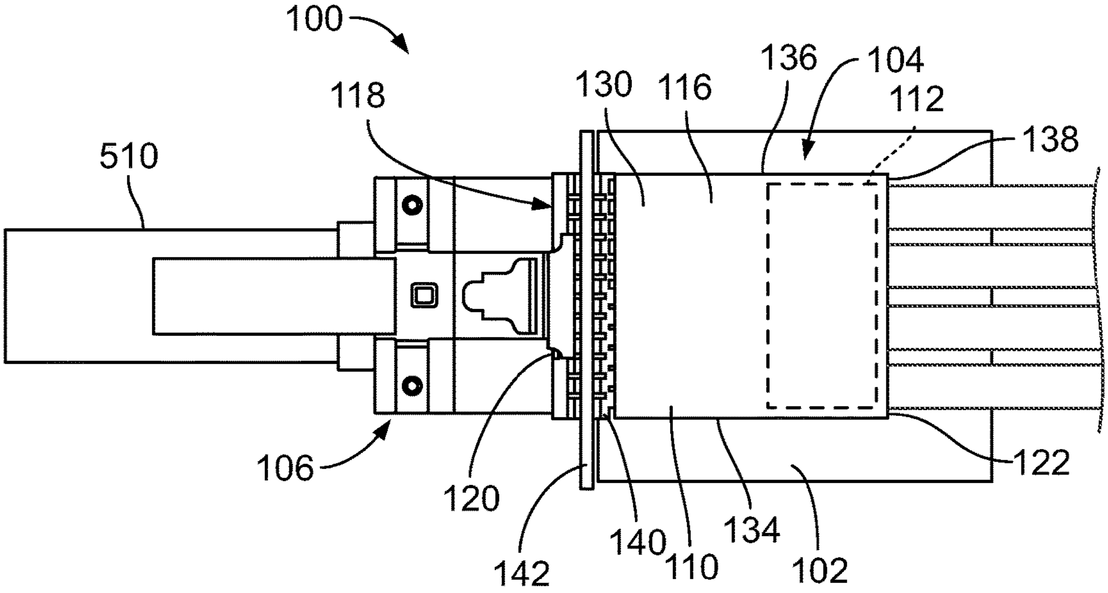
FIG. 3 is a top view of the communication system formed in accordance with an exemplary embodiment.

FIG. 1 is a front perspective view of a communication system 100 formed in accordance with an exemplary embodiment. FIG. 2 is a side view of the communication system 100 formed in accordance with an exemplary embodiment. FIG. 3 is a top view of the communication system 100 formed in accordance with an exemplary embodiment. The communication system 100 includes a host circuit board 102 and one or more receptacle connector assemblies 104 mounted to the host circuit board 102 (FIG. 1 illustrates multiple receptacle connector assemblies 104 and FIG. 3 illustrates a single receptacle connector assembly 104). A pluggable module 106 is configured to be electrically connected to each receptacle connector assembly 104. The pluggable module 106 may be electrically connected to the host circuit board 102 through the receptacle connector assembly 104. The pluggable module 106 may be electrically connected to another component, such as a chip, a processor, or another type of electrical component through the receptacle connector assembly 104. In an exemplary embodiment, the receptacle connector assembly 104 is a cable connector having cables extending therefrom and routed to a remote location, such as to the component.

In an exemplary embodiment, the receptacle connector assembly 104 includes a receptacle cage 110 and a card edge connector 112 (shown with phantom lines). The receptacle cage 110 forms a cavity 114 that receives the card edge connector 112 and the pluggable module 106. In various embodiments, the receptacle cage 110 is enclosed and provides electrical shielding for the card edge connector 112 and the pluggable module 106. In an exemplary embodiment, the receptacle cage 110 is a shielding, stamped and formed cage member that includes a plurality of shielding walls 116 that define the cavity 114. In other various embodiments, the card edge connector 112 may be located rearward of the receptacle cage 110. In other embodiments, the receptacle cage 110 may be open between frame members to provide cooling airflow for the pluggable module 106. In the illustrated embodiment, the card edge connector 112 is oriented for horizontal mating (for example, parallel to the host circuit board 102). In other various embodiments, the card edge connector 112 is oriented for vertical mating (for example, perpendicular to the host circuit board 102).

In the illustrated embodiment, the receptacle cage 110 is a single port receptacle cage configured to receive a single pluggable module 106. In other various embodiments, the receptacle cage 110 may be a ganged cage member having a plurality of ports ganged together in a single row and/or a stacked cage member having multiple ports stacked as an upper port and a lower port for receiving corresponding pluggable modules 106. The receptacle cage 110 includes a module channel 118 having a module port open to the module channel 118. The module channel 118 receives the pluggable module 106 through the module port. In an exemplary embodiment, the receptacle cage 110 extends between a front end 120 and a rear end 122. The module port is provided at the front end 120. Any number of module channels 118 may be provided in various embodiments arranged in a single column or in multiple columns (for example, 2×2, 3×2, 4×2, 4×3, 4×1, 2×1, and the like). Optionally, multiple card edge connectors 112 may be arranged within the receptacle cage 110, such as when multiple rows and/or columns of module channels 118 are provided.

In an exemplary embodiment, the walls 116 of the receptacle cage 110 include a top wall 130, a bottom wall 132, a first side wall 134 and a second side wall 136 extending from the top wall 130. The bottom wall 132 may rest on the host circuit board 102. In other various embodiments, the receptacle cage 110 may be provided without the bottom wall 132. Optionally, the walls 116 of the receptacle cage 110 may include a rear wall 138 at the rear end 122. The walls 116 define the cavity 114. For example, the cavity 114 may be defined by the top wall 130, the bottom wall 132, the side walls 134, 136 and the rear wall 138. In various embodiments, the cavity 114 receives the card edge connector 112 at the rear end 122. Other walls 116 may separate or divide the cavity 114 into additional module channels 118, such as in embodiments using ganged and/or stacked receptacle cages. For example, the walls 116 may include one or more vertical divider walls and/or one or more horizontal divider walls between the module channels 118.

In an exemplary embodiment, the receptacle cage 110 may include one or more gaskets 140 at the front end 120 for providing electrical shielding for the module channels 118. For example, the gaskets 140 may be provided at the port to electrically connect the receptacle cage 110 with the pluggable modules 106 received in the module channel 118. The gaskets 140 electrically connect the receptacle cage 110 to a panel 142 (shown in FIG. 1). The gaskets 140 are provided around the exterior of the receptacle cage 110 for interfacing with the panel 142, such as when the front end 120 of the receptacle cage 110 extends through a cutout in the panel 142. The gaskets 140 may include spring fingers or other deflectable features that are configured to be spring biased against the panel 142 to create an electrical connection with the panel 142.

Optionally, the receptacle connector assembly 104 may include one or more heat sinks (not shown) for dissipating heat from the pluggable modules 106 and the card edge connectors 112. For example, the heat sink may be coupled to the top wall 130 for engaging the pluggable module 106 received in the module channel 118. The heat sink may extend through an opening in the top wall 130 to directly engage the pluggable module 106. Other types of heat sinks may be provided in alternative embodiments.

In an exemplary embodiment, the pluggable module 106 includes a cable assembly having cables 510, such as high speed cables, which may be coaxial cables, twin-axial cables, twisted pair cables, flexible circuit cables, and the like. The pluggable module 106 includes a pluggable body 500 defined by one or more shells. The pluggable body 500 may be thermally conductive and/or may be electrically conductive, such as to provide EMI shielding for the cables 510. The pluggable body 500 includes a mating end 502 and an opposite cable end 504. The mating end 502 is configured to be inserted into the corresponding module channel 118. The cable end 504 has the cables 510 extending therefrom, which may be routed to another component or another pluggable module 106 within the communication system 100.

The pluggable module 106 includes an outer perimeter defining an exterior of the pluggable body 500. For example, the outer perimeter may be defined by a top 520, a bottom 522, a first side 524 and a second side 526. The pluggable body 500 may have other shapes in alternative embodiments. In an exemplary embodiment, the pluggable body 500 provides heat transfer for components of the pluggable module 106. In an exemplary embodiment, the pluggable body 500 includes an upper shell 530 and a lower shell 532. The upper and lower shells 530, 532 are joined, such as along the sides 524, 526. The upper and lower shells 530, 532 may be die cast shells. In alternative embodiments, the upper and lower shells 530, 532 may be stamped and formed shells. The upper and lower shells 530, 532 define a cavity 534. The cavity 534 may be defined by the top 520, the bottom 522, the first side 524 and the second side 526.

In an exemplary embodiment, the pluggable module 106 includes a latch 536 for securing the pluggable module 106 to the receptacle cage 110. The latch 536 includes one or more latching fingers configured to be latchably secured to the receptacle cage 110. In various embodiments, the latch 536 includes a pull tab for actuating the latch 536. The latch 536 may be actuated by other devices in alternative embodiments. In the illustrated embodiment, the latch 536 is provided at the top 520; however, the latch 536 may be provided at other locations, such as the bottom 522 or the sides 524, 526.

In an exemplary embodiment, the latch 536 is located along the exterior of the pluggable body 500. However, portions of the latch 536 may be located interior of the pluggable body 500 in other various embodiments. The latching fingers may be coupled to the exterior of the receptacle cage 110 in various embodiments, such as to reduce the overall height of the receptacle cage 110.

In an exemplary embodiment, the pluggable module 106 includes a module circuit card 540 received in the cavity 534 of the pluggable body 500. The module circuit card 540 is configured to be communicatively coupled to the card edge connector 112. The module circuit card 540 is accessible at the mating end 502. The cables 510 are coupled to the module circuit card 540. The module circuit card 540 has a card edge 542 extending between a first or upper surface 544 and a second or lower surface 546 at a mating end of the module circuit card 540. The module circuit card 540 includes contact pads 548, such as circuits or traces forming pads, at the card edge 542 configured to be mated with the card edge connector 112. In an exemplary embodiment, the contact pads 548 are provided on the upper surface 544 and the lower surface 546. The module circuit card 540 may include components, circuits and the like used for operating and or using the pluggable module 106. For example, the module circuit card 540 may have conductors, traces, pads, electronics, sensors, controllers, switches, inputs, outputs, and the like to form various circuits. The cables 510 are terminated to the module circuit card 540, such as at the end opposite the contact pads 548.

Figure 4:
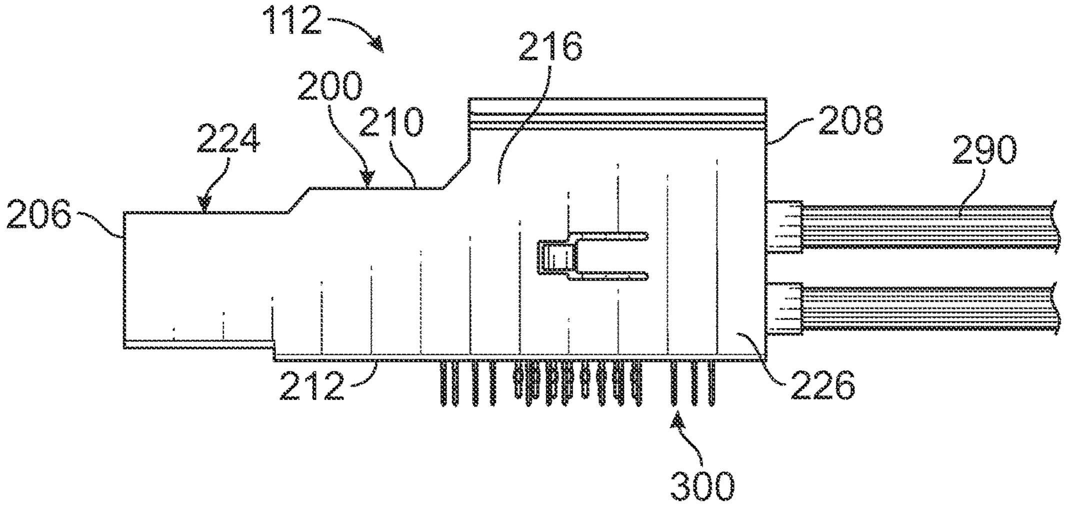
FIG. 4 is a side view of the card edge connector in accordance with an exemplary embodiment.
Figure 5:
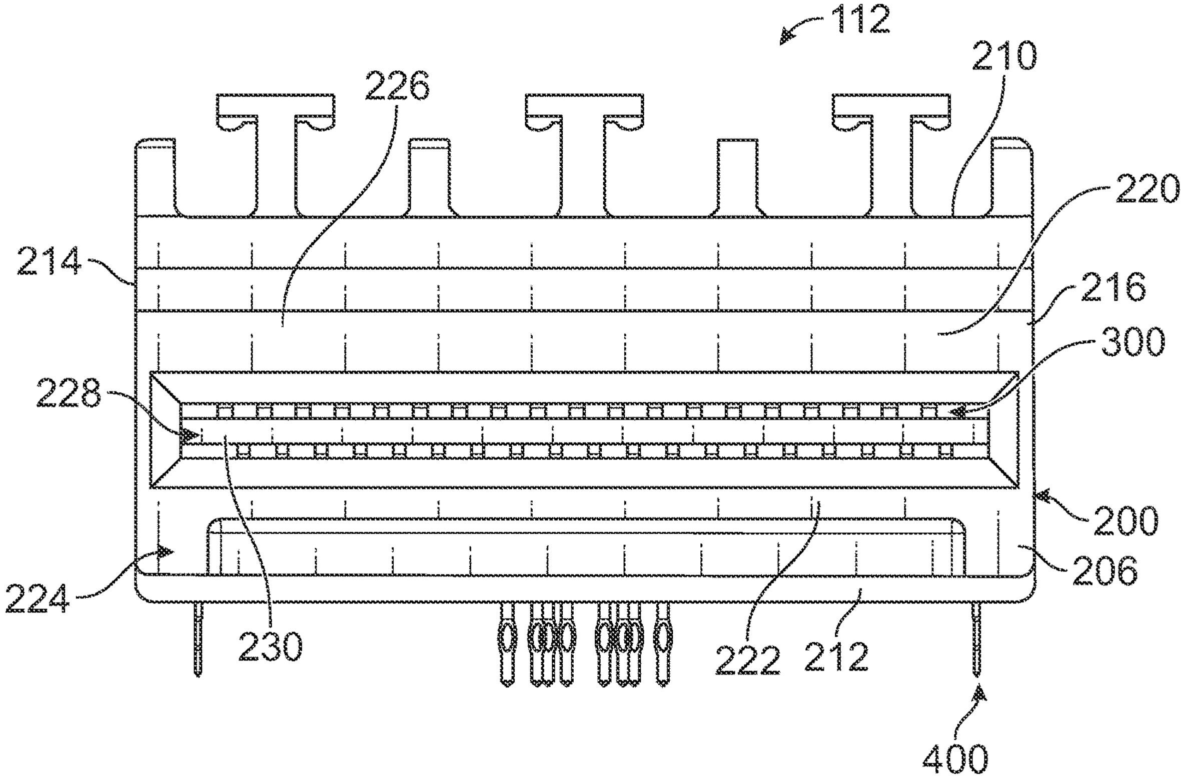
FIG. 5 is a front view of the card edge connector in accordance with an exemplary embodiment.
Figure 6:
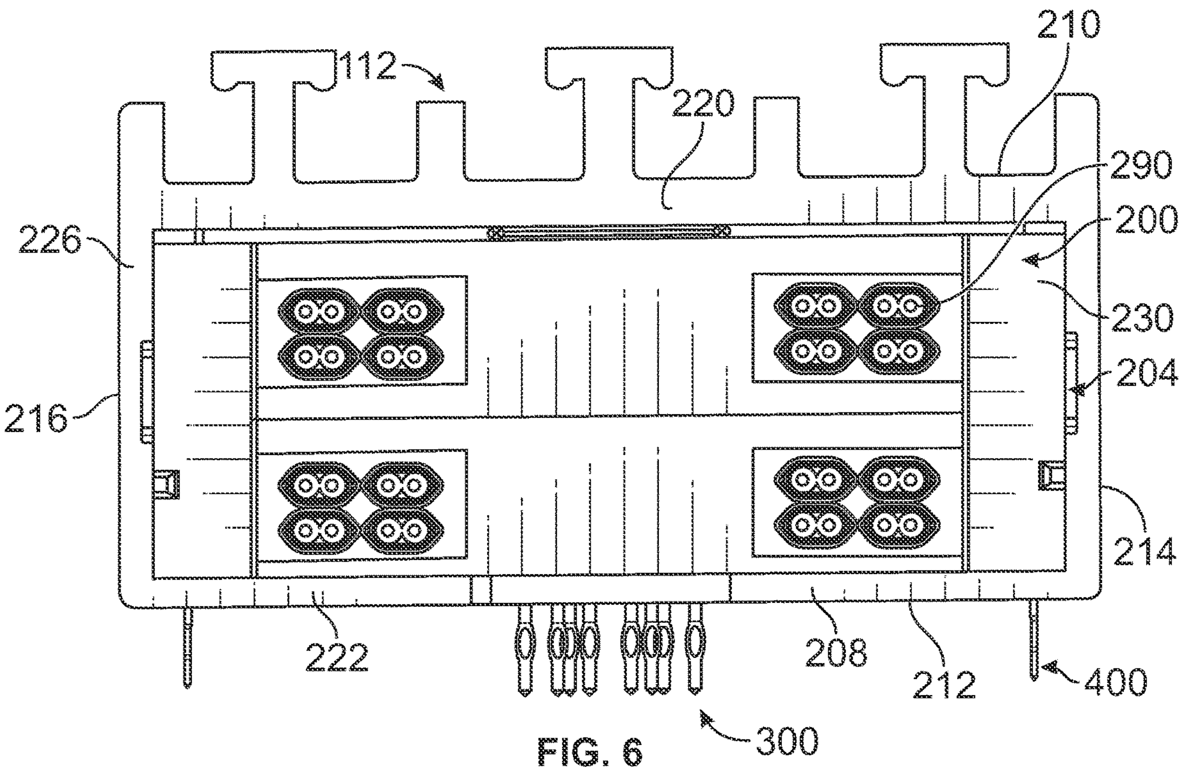
FIG. 6 is a rear view of the card edge connector in accordance with an exemplary embodiment.

FIG. 4 is a side view of the card edge connector 112 in accordance with an exemplary embodiment. FIG. 5 is a front view of the card edge connector 112 in accordance with an exemplary embodiment. FIG. 6 is a rear view of the card edge connector 112 in accordance with an exemplary embodiment.

The card edge connector 112 includes a housing 200, a contact assembly 300 received in a cavity 204 of the housing 200, and a ground element 400 received in the cavity 204 of the housing 200. Cables 290 are terminated to corresponding contacts of the contact assembly 300 (for example, to cable contacts of the contact assembly 300). The contact assembly 300 is configured to be mated with the pluggable module 106 (shown in FIG. 1). In an exemplary embodiment, a portion or subset of the contacts of the contact assembly 300 are configured to be electrically connected to the host circuit board 102 (shown in FIG. 1). For example, such contacts are board contacts configured to be press-fit into plated vias of the host circuit board 102. The ground element 400 is configured to be electrically connected to the contact assembly 300. The ground element 400 is configured to be electrically connected to the host circuit board 102 (shown in FIG. 1). For example, the ground element may include compliant pins configured to be press-fit into plated vias in the host circuit board 102.

The housing 200 extends between a front 206 and a rear 208. The housing 200 extends between a top 210 and a bottom 212. The housing 200 extends between opposite first and second sides 214, 216. The housing 200 may be generally box shaped in various embodiments. In the illustrated embodiment, the bottom 212 defines a mounting end configured to be mounted to the host circuit board 102 and the front 206 defines the mating end configured to be mated with the pluggable module 106. Other orientations are possible in alternative embodiments. In an exemplary embodiment, the cables 290 extend from the rear 208 of the housing 200. The cables 290 extend into the cavity 204 for termination to the contact assembly 300.

The housing 200 includes a top wall 220 at the top 210 and a bottom wall 222 at the bottom 212. In the illustrated embodiment, the housing 200 includes a shroud 224 at the front 206 configured to be mated with the pluggable module 106. The shroud 224 is configured to be received in the pluggable module 106. In an exemplary embodiment, the housing 200 is a multi-piece housing including an outer housing 226 and a contact organizer 230 received in the outer housing 226. The contact organizer 230 holds the contact assembly 300 and positions the contact assembly 300 in the outer housing 226. The outer housing 226 includes a front slot 228 at the front 206. The front slot 228 forms a card slot that provides access to the contact organizer 230 and the contact assembly 300. The front slot 228 is configured to receive the module circuit card 540 (shown in FIG. 1) to interface with the contact assembly 300.

Figure 7:
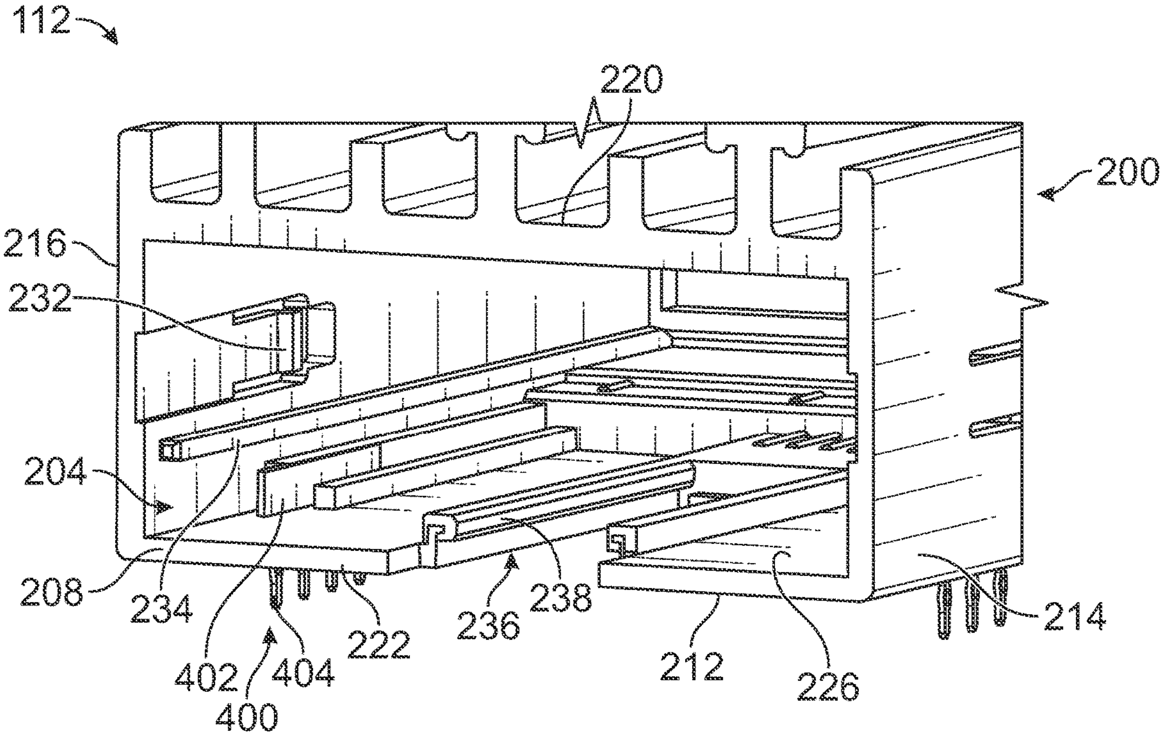
FIG. 7 is a rear perspective view of a portion of the card edge connector in accordance with an exemplary embodiment showing the outer housing.

FIG. 7 is a rear perspective view of a portion of the card edge connector 112 in accordance with an exemplary embodiment showing the outer housing 226. The walls of the outer housing 226 form the cavity 204 configured to receive the contact organizer 230 (shown in FIG. 8) and the contact assembly 300 (shown in FIG. 8).

The outer housing 226 includes latches 232 in the side walls of the outer housing 226 used to retain the contact organizer 230 in the cavity 204. The latches may be deflectable latches. Other types of securing features may be used in alternative embodiments.

The outer housing 226 includes guide features 234 used to guide loading of the contact organizer 230 in the cavity 204. In the illustrated embodiment, the guide features 234 are ribs. The guide features 234 extend horizontally, such as extending between the rear 208 and the front 206. The guide features 234 are located along the side walls. The guide features 234 may be located along the top wall 220 and/or the bottom wall 222. Other types of locating features may be used in alternative embodiments to position the contact organizer 230 in the cavity 204.

In an exemplary embodiment, the outer housing 226 includes a bottom opening 236 in the bottom wall 222. The bottom opening 236 allows components to pass through the outer housing 226, such as for interfacing with the host circuit board 102 (shown in FIG. 1). For example, portions of the contact assembly 300 may pass through the bottom opening 236 for connection to the host circuit board 102. In an exemplary embodiment, rails 238 extend along the bottom opening 236. The rails 238 are used to position the contact assembly 300 within the bottom opening 236.

In an exemplary embodiment, the outer housing 226 holds at least a portion of the ground element 400, such as a lower portion of the ground element 400. The lower portion of the ground element 400 includes a ground plate 402. Optionally, ground plates 402 may be provided at both sides 214, 216 of the housing 200. The ground element 400 includes board termination components 404 configured to be terminated to the host circuit board 102. The board termination components 404 pass through the bottom wall 222 and extend from the bottom 212 of the housing 200. In various embodiments, the board termination components 404 are compliant pins. The board termination components 404 are configured to be press-fit into plated vias of the host circuit board 102. Other types of termination components may be used in alternative embodiments, such as solder tails, spring contacts, and the like.

Figure 8:
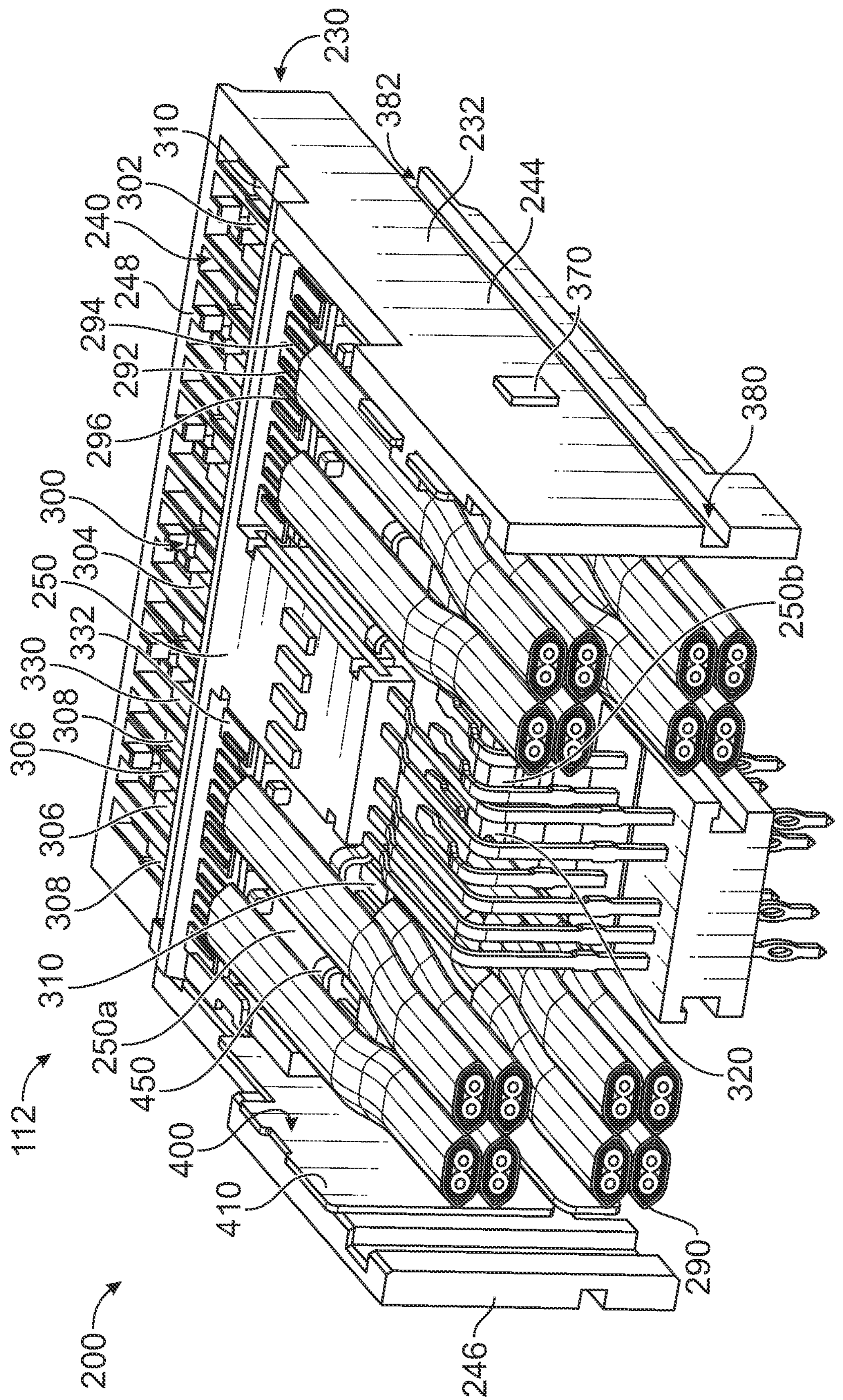
FIG. 8 is a rear perspective view of a portion of the card edge connector in accordance with an exemplary embodiment showing the contact organizer holding the contact assembly.

FIG. 8 is a rear perspective view of a portion of the card edge connector 112 in accordance with an exemplary embodiment showing the contact organizer 230 holding the contact assembly 300. In an exemplary embodiment, the contact organizer 230 holds a portion of the ground element 400, such as an upper portion of the ground element 400. The upper portion of the ground element 400 includes a ground plate 410 (shown in further detail in FIG. 10). Optionally, ground plates 410 may be provided at both sides of the contact organizer 230. In an exemplary embodiment, the contact organizer 230 holds ground bus bars 450 (shown in further detail in FIG. 9) coupled to the ground element 400. The ground bus bars 450 are used to electrically common ground contacts of the contact assembly 300. The ground element 400 electrically connects the ground bus bars 450 to the host circuit board 102 (shown in FIG. 1).

The contact assembly 300 includes a plurality of cable contacts 302. Optionally, the contact assembly 300 may include a plurality of board contacts 304. In the illustrated embodiment, the board contacts 304 are centered in the contact assembly 300 being flanked on both sides by the cable contacts 302. Other arrangements are possible in alternative embodiments. The cables 290 are terminated to the cable contacts 302 of the contact assembly 300. The board contacts 304 are configured to be terminated to the host circuit board 102 (shown in FIG. 1). In an exemplary embodiment, the cable contacts 302 include signal contacts 306 and ground contacts 308. The signal contacts 306 may be arranged in pairs. The ground contacts 308 are interspersed with the signal contacts 306, such as being arranged between the pairs of the signal contacts 306. The board contacts 304 may include signal contacts and/or ground contacts and/or power contacts. The ground contacts may be electrically commoned, such as using the ground bus bars 450 and may be electrically connected to the ground element 400 by the ground bus bars 450. The ground element 400 is used to electrically connect the ground contacts with the host circuit board 102. The ground element 400 forms a ground return path for the card edge connector 112 with the host circuit board 102. Optionally, the ground bus bars 450 may include upper ground bus bars coupled to the upper contacts and lower ground bus bars coupled to the lower contacts.

In an exemplary embodiment, the cable contacts 302 are high speed contacts and the board contacts 304 are low speed contacts. For example, the cable contacts 302 may include high speed transmit contacts and high speed receive contacts and the board contacts 304 may include low speed sideband contacts. As such, the high speed signals are transmitted through the cables 290 and the low speed signals are transmitted through the host circuit board 102. High speed signals may be signals above 64 GHz. Optionally, cable contacts 302 may transmit high speed signals above 100 GHz.

The contact assembly 300 includes an upper contact set of upper contacts 310 and a lower contact set of lower contacts 320. The upper contact set is used for mating with the contact pads on the upper surface of the module circuit card 540 (shown in FIG. 1). Optionally, the upper contacts 310 may be arranged in multiple rows, such as a forward row and a rearward row to increase the density and number of electrical connections between the contact assembly 300 and the module circuit card 540. The lower contact set is used for mating with the contact pads on the lower surface of the module circuit card 540. Optionally, the lower contacts 320 may be arranged in multiple rows, such as a forward row and a rearward row to increase the density and number of electrical connections between the contact assembly 300 and the module circuit card 540.

The contact organizer 230 supports the upper contacts 310 and the lower contacts 320. The contact organizer 230 is used to position the upper and lower contacts 310, 320 relative to each other. The contact organizer 230 is used to hold the contacts 310, 320 for loading the contacts 310, 320 into the housing 200. In an exemplary embodiment, the upper contacts 310 are arranged in one or more arrays and the lower contacts 320 are arranged in one or more arrays. The contact arrays are defined by leadframes having stamped and formed contacts forming the upper contacts 310 and the lower contacts 320.

In an exemplary embodiment, the contacts 310, 320 are held by contact holders 250. Optionally, each contact array/leadframe is held by a corresponding contact holder 250. The contact holder 250 is dielectric, such as being plastic. The contact holder 250 is loaded into the contact organizer 230 to hold the contacts 310, 320 relative to the contact organizer 230. In an exemplary embodiment, each contact holder 250 includes an overmolded body overmolded over the leadframe to hold the contacts 310, 320 of the leadframes together. For example, the upper contact arrays/leadframes include corresponding upper contact holders 250*a* and the lower contact arrays/leadframes include corresponding lower contact holders 250*b*. The contact holders 250 encase portions of the contacts 310, 320. In various embodiments, the contact holders 250 are overmolded around portions of the contacts 310, 320, to hold the relative positions of the contacts 310, 320, such as for loading the contacts 310, 320 into the contact organizer 230. The contact holders 250 are coupled to the contact organizer 230 to load the upper and lower contacts 310, 320 in the contact organizer 230 to form the contact assembly 300. The assembled contact assembly 300 is configured to be loaded into the housing 200.

The contact organizer 230 includes a main body having first and second side walls 244, 246 and a platform 248 between the side walls 244, 246. The platform 248 is used to support the upper and lower contacts 310, 320. The platform 248 separates the upper contacts 310 from the lower contacts 320, such as forming a card slot therebetween configured to receive the module circuit card 540. The side walls 244, 246 may hold or support the contact holders 250. The side walls 244, 246 may hold the ground plates 410 of the ground element 400.

Each cable contact 302 extends between a mating end 330 and a terminating end 332. The mating ends 330 of the cable contacts 302 are configured to be mated with the module circuit card 540. In an exemplary embodiment, the mating ends 330 include deflectable mating beams, such as spring fingers. The mating ends 330 extend forward of the contact holder 250 for mating with the module circuit card 540. The mating ends 330 of the upper and lower contact arrays (for example, of the upper contacts 310 and the lower contacts 330) face each other across a gap/card slot that receives the module circuit card 540. In an exemplary embodiment, the mating ends 330 are held in contact channels 240 along the top and bottom of the platform 248 of the contact organizer 230.

The terminating ends 332 of the cable contacts 302 are configured to be terminated to ends of the cables 290. In an exemplary embodiment, the terminating ends 332 include pads, such as weld pads. The terminating ends 332 extend rearward from the contact holder 250 for termination to the cables 290. In the illustrated embodiment, the cables 290 are twin-axial cables. Each cable 290 includes a pair of signal conductors 292, 294. The signal conductors 292, 294 are welded to the terminating ends 332 of the corresponding signal contacts 310. Each cable 290 includes one or more drain wires 296. The drain wires 296 are welded to the terminating ends 332 of the corresponding ground contacts 308. Optionally, each cable 290 includes a cable shield surrounding the signal conductors 292, 294. An outer jacket may surround the cable shield.

The contact organizer 230 includes latching features 370 for securing the contact organizer 230 in the housing 200. In an exemplary embodiment, the latching feature 370 includes a latch block having a latching surface. The latching feature 370 is configured to be latchably coupled to the latching feature of the housing 200. Other types of securing features may be used in alternative embodiments. The latching features 370 are provided on the side walls 244, 246 in the illustrated embodiment.

The contact organizer 230 includes guide features 380 to guide mating of the contact organizer 230 with the housing 200. In the illustrated embodiment, the guide features 380 include guide slots 382 extending along the side walls 244, 246. Other types of guide features 380 may be provided in alternative embodiments.

Figure 9:
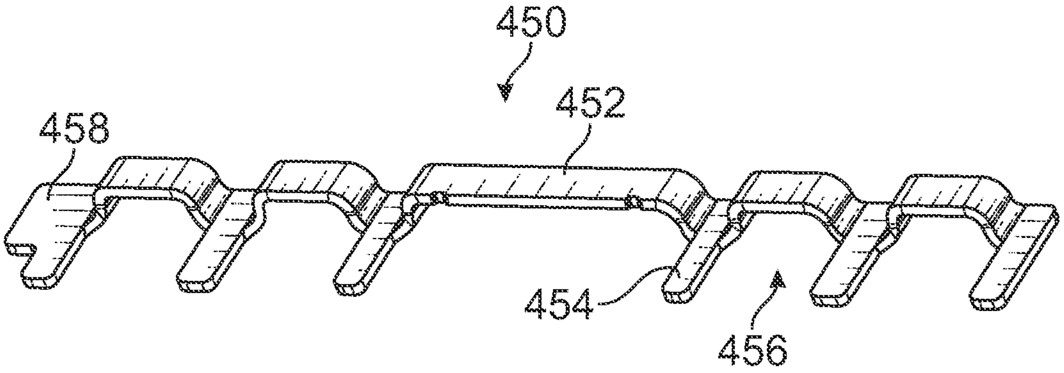
FIG. 9 is a perspective view of the ground bus bar in accordance with an exemplary embodiment.

FIG. 9 is a perspective view of the ground bus bar 450 in accordance with an exemplary embodiment. The ground bus bar 450 is electrically conductive. For example, the ground bus bar 450 is manufactured from a metal material. In various embodiments, the ground bus bar 450 is a stamped and formed part.

The ground bus bar 450 includes a connecting bar 452 and ground fingers 454 extending from the connecting bar 452. The ground fingers 454 are configured to be connected to the ground contacts 308 (shown in FIG. 8). For example, the ground fingers 454 may be welded to the terminating ends of the ground contacts 308.

In an exemplary embodiment, the connecting bar 452 includes hoods 456. The hoods 456 extend out of plane relative to the ground fingers 454. The hoods 456 are configured to span across each of the pairs of signal contacts 306 (shown in FIG. 8) and are configured to be electrically isolated (such as due to spacing or distancing) from the signal contacts 306.

In an exemplary embodiment, the ground bus bar 450 includes a connecting pad 458. The connecting pad 458 is provided at an end of the connecting bar 452. The connecting pad 458 is configured to be electrically connected to the ground plate 410 (shown in FIG. 9). For example, the ground plate 410 may be welded to the connecting pad 458.

Figure 10:
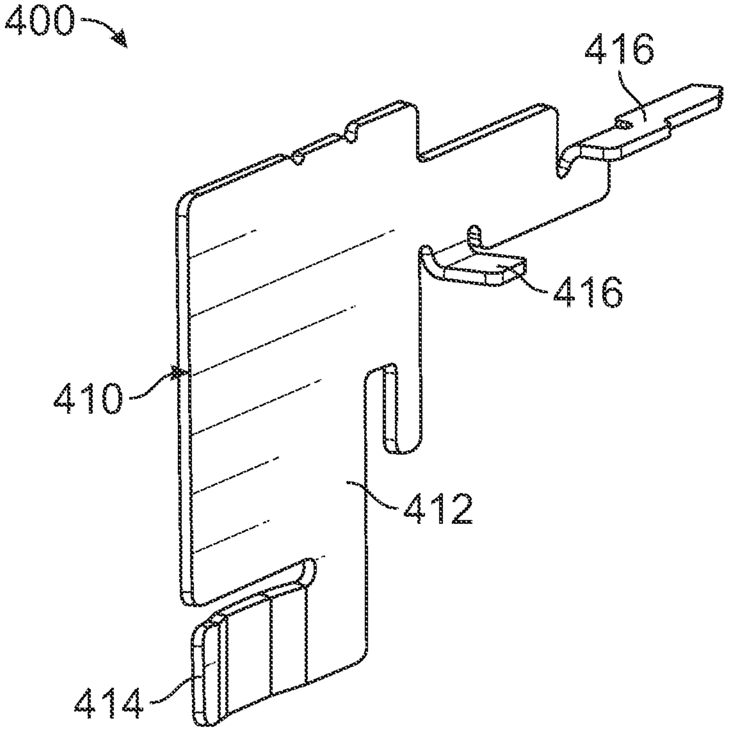
FIG. 10 is a perspective view of the ground plate of the ground element in accordance with an exemplary embodiment.

FIG. 10 is a perspective view of the ground plate 410 of the ground element 400 in accordance with an exemplary embodiment. The ground plate 410 is electrically conductive. For example, the ground plate 410 is manufactured from a metal material. In various embodiments, the ground plate 410 is a stamped and formed part.

The ground plate 410 includes a main body 412 and one or more connecting tabs 416 extending from the main body. The connecting tabs 416 are configured to be electrically connected to the ground bus bars 450 (shown in FIG. 8). For example, the connecting tabs 416 may be welded to the connecting pads 458 (shown in FIG. 8). In various embodiments, the connecting tabs 416 are bent and extend transverse to the main body 412. For example, the connecting tabs 416 may be bent perpendicular to the main body 412.

The ground plate 410 includes a mating tab 414 configured to be mated to the ground plate 402 (shown in FIG. 7). The mating tab 414 is provided at a bottom of the ground plate 410 in the illustrated embodiment. The mating tab 414 may be deflectable and may be deflected when mated with the ground plate 402. As such, the mating tab 414 may be spring biased against the ground plate 402 to maintain a mechanical and electrical connection with the ground plate 402. Other types of connecting features may be used in alternative embodiments to create an electrical connection between the ground plate 410 and the ground plate 402. In other various embodiments, the ground plate 402 may be integral with the ground plate 410, such as being stamped and formed from a single sheet of sheet metal.

Figure 11:
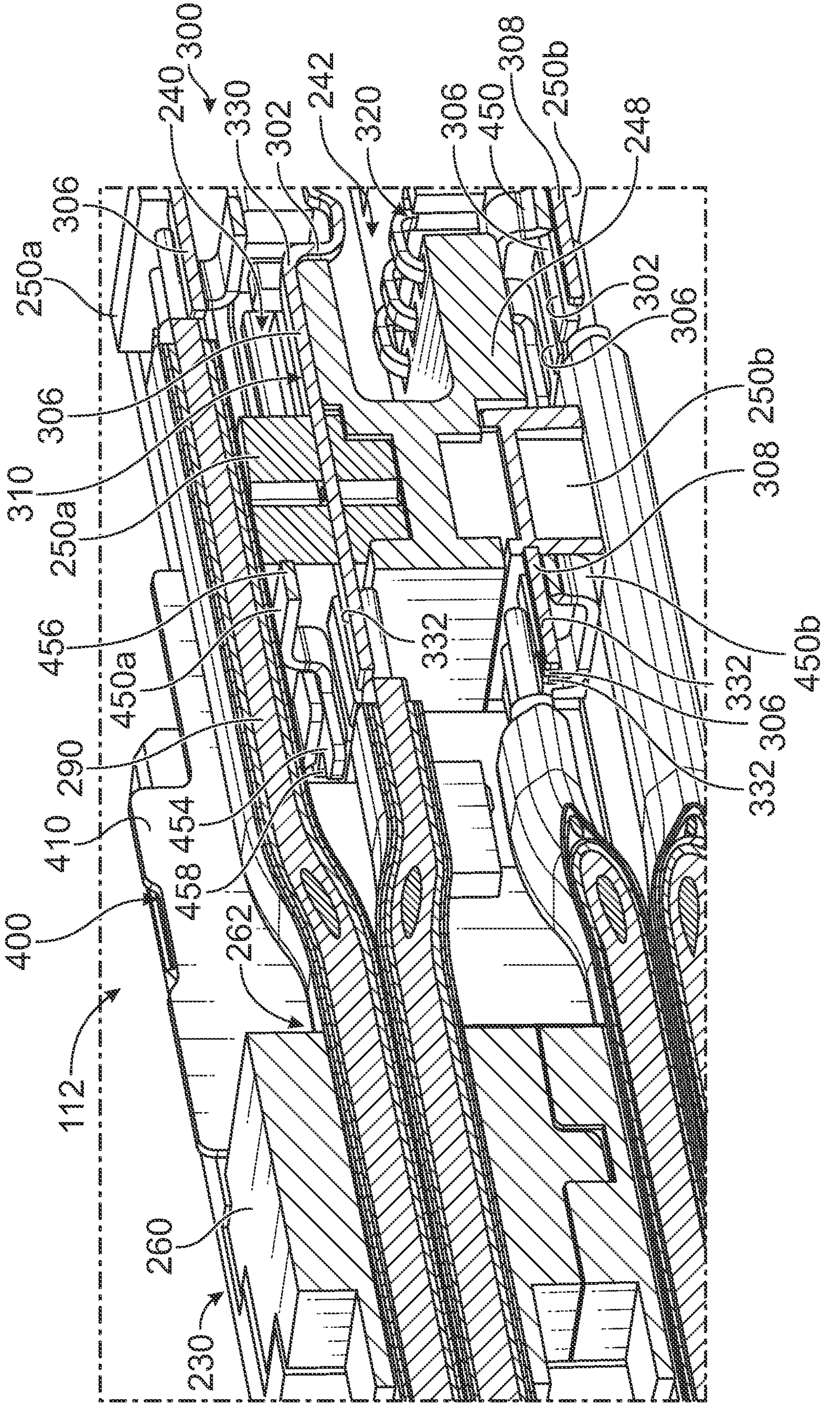
FIG. 11 is a sectional view of a portion of the card edge connector in accordance with an exemplary embodiment.

FIG. 11 is a sectional view of a portion of the card edge connector 112 in accordance with an exemplary embodiment. FIG. 11 shows the contact organizer 230 holding the contact assembly 300. FIG. 11 shows the cables 290 coupled to the contact assembly 300. FIG. 11 shows the ground bus bar(s) 450 terminated to the contact assembly 300. FIG. 11 shows the ground element 400 terminated to the ground bus bar(s) 450.

The contact organizer 230 supports the cable contacts 302 of the contact assembly 300. The upper contacts 310 of the upper contact arrays/leadframes are held in the upper contact holders 250*a* and the lower contacts 320 of the lower contact arrays/leadframes are held in the lower contact holders 250*b*. The mating ends 330 extend forward of the contact holders 250 into the contact channels 240 along the top and bottom of the platform 248. Tips or fingers of the mating ends 330 extend forward from the contact holders 250 into a card slot 242 at the front of the contact organizer 230 for interfacing with the module circuit card 540 (the mating interfaces of the rearward rows of the contacts 302 are shown in FIG. 11). The terminating ends 332 extend rearward from the contact holders 250 for connection with the cables 290. The contact holders 250 are held in pockets or channels in the contact organizer 230 to position the cable contacts 302 relative to the contact organizer 230.

The ground bus bars 450 are electrically connected to the ground contacts 308 of the contact assembly 300. In an exemplary embodiment, upper ground bus bars 450*a* are coupled to the upper contacts 310 and lower ground bus bars 450*b* are coupled to the lower contacts 320. The ground fingers 454 are connected (for example, welded) to the terminating ends 332 of the ground contacts 308. The hoods 456 span across (for example, above or below) each of the pairs of signal contacts 306 and are configured to be electrically isolated (for example, separated) from the signal contacts 306. The ground bus bars 450 electrically connect each of the corresponding ground contacts 308.

The ground plate 410 of the ground element 400 is electrically connected to the ground bus bars 450. In an exemplary embodiment, mating tabs 414 are coupled (for example, welded) to the connecting pads 458 of the ground bus bars 450. The ground plate 410 forms a ground return path for the card edge connector 112 with the host circuit board 102. The ground plate 410 electrically connects the ground bus bars 450, and thus the ground contacts 308, to the host circuit board. The current through the ground paths may thus be directed to the host circuit board 102, reducing current through the cables, which may reduce heating of the components such as the cables and the ground contacts. The ground plate 410 forms a heat sink for the card edge connector 112 transferring heat generated in the ground contacts 308 to the host circuit board 102.

In an exemplary embodiment, the card edge connector 112 includes cable holders 260 at the rear of the contact organizer 230. The cable holders 260 hold the cables 290 and may provide strain relief for the cables 290. The cable holders 260 position the cables 290 relative to the contact organizer 230. The cables 290 pass through the cable holders 260, such as through openings 262. The cable holders 260 may be pre-formed. Alternatively, the cable holders 260 may be formed in place, such as by filling the cavity of the contact organizer 230 with epoxy or other filler material. In various embodiments, the cable holders 260 may provide sealing along the cables 290.

Figure 12:
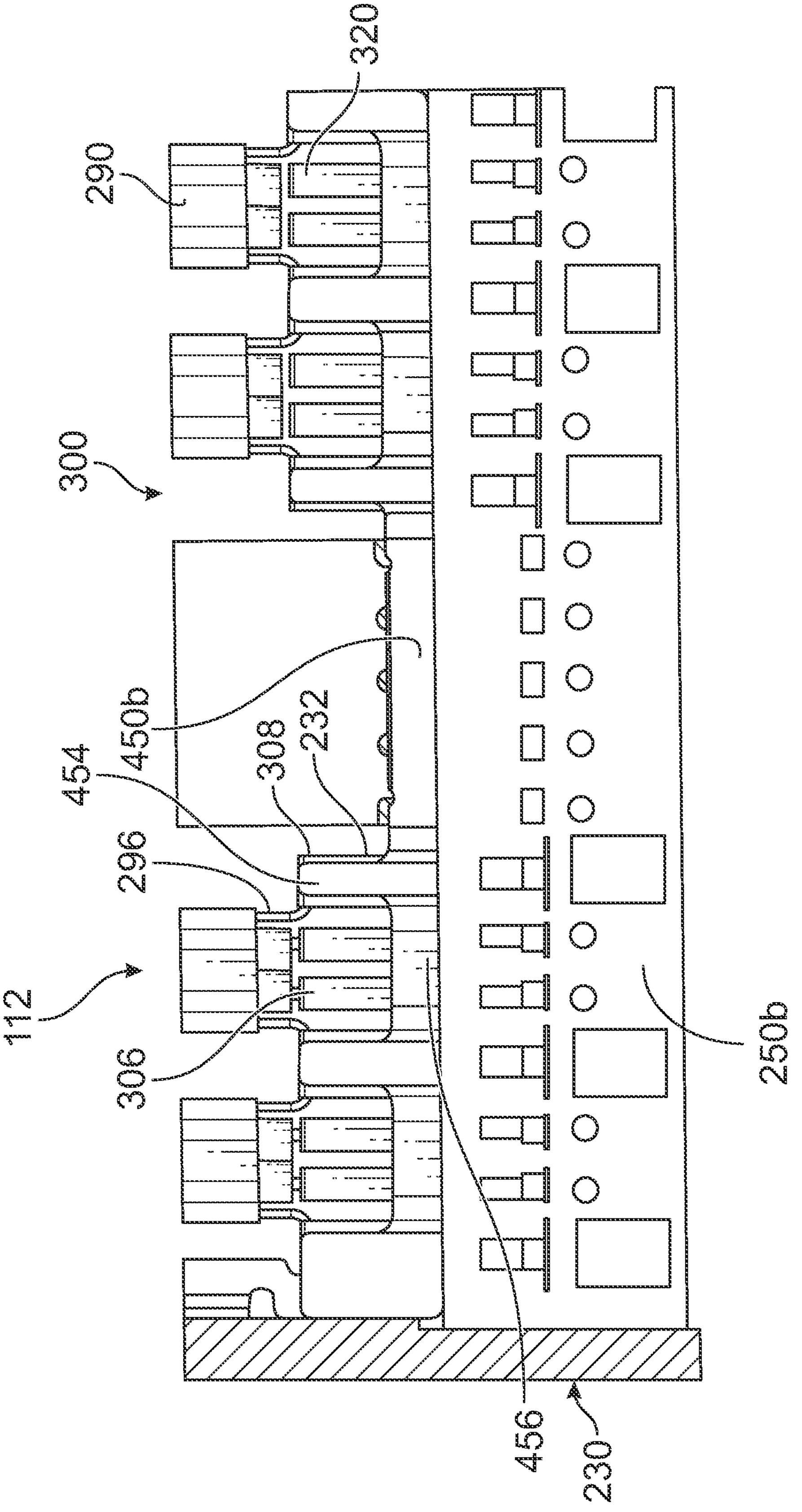
FIG. 12 is a bottom view of a portion of the card edge connector in accordance with an exemplary embodiment.

FIG. 12 is a bottom view of a portion of the card edge connector 112 in accordance with an exemplary embodiment. FIG. 12 shows the cables 290 coupled to the lower contacts 320 of the contact assembly 300. FIG. 12 shows the lower ground bus bar 450*b* terminated to the lower ground contacts 308 of the contact assembly 300. FIG. 12 shows the lower contact holder 250*b* holding the lower contacts 320.

The lower ground bus bar 450*b* is coupled to the lower ground contacts 308. The ground fingers 454 are connected (for example, welded) to the terminating ends 332 of the ground contacts 308. The hoods 456 span across each of the pairs of signal contacts 306 and are configured to be electrically isolated (for example, separated) from the signal contacts 306. The drain wires 296 are also electrically connected to the terminating ends 332 of the ground contacts 308.

Figure 13:
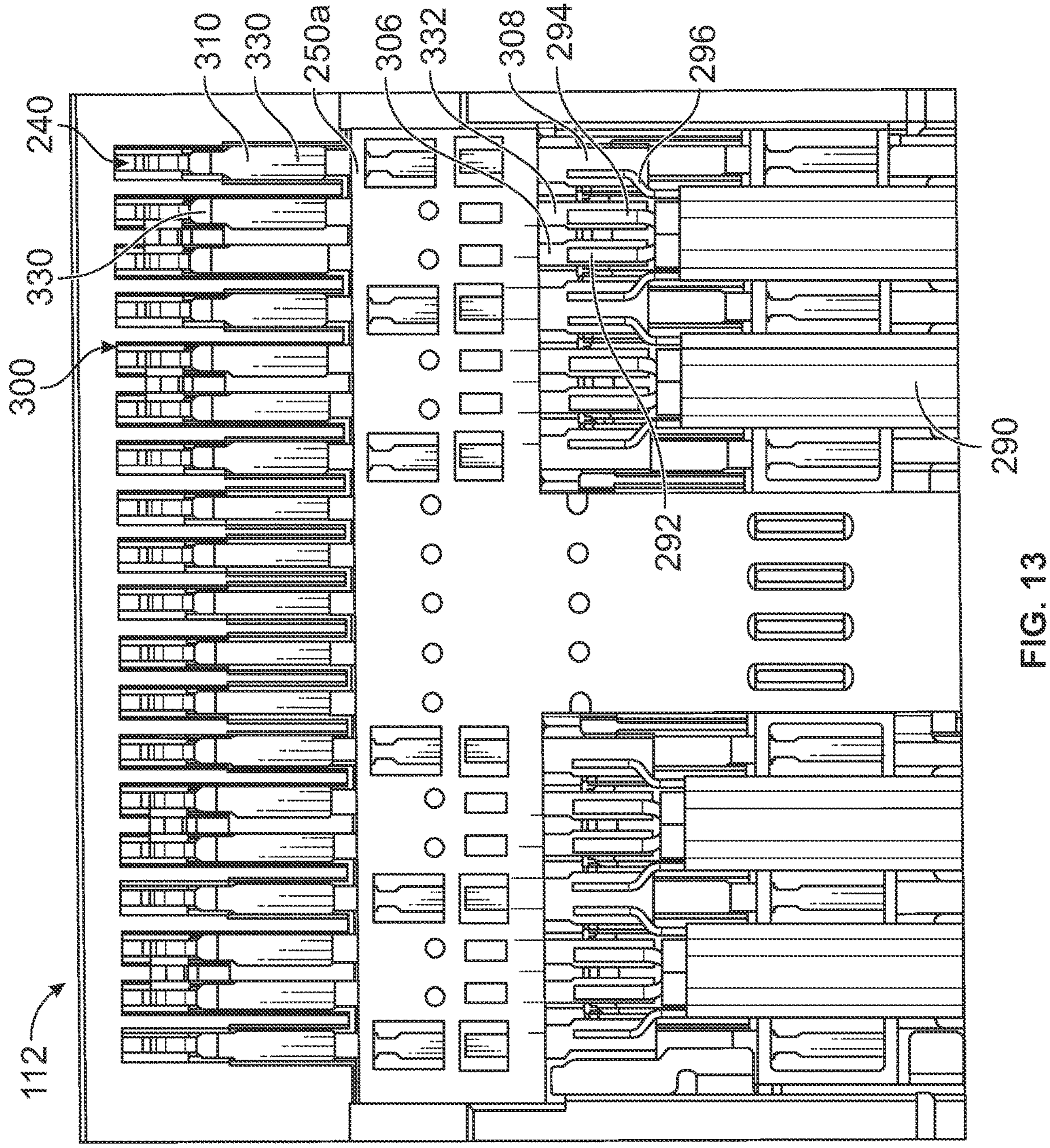
FIG. 13 is a top view of a portion of the card edge connector in accordance with an exemplary embodiment.

FIG. 13 is a top view of a portion of the card edge connector 112 in accordance with an exemplary embodiment. FIG. 13 shows the cables 290 coupled to the forward contact set of the upper contacts 310 of the contact assembly 300. FIG. 13 also shows portions of the upper contacts 310 of the rearward contact set. FIG. 13 shows the upper contact holders 250*a* holding the upper contacts 310.

The upper contact holders 250*a* hold the upper contacts 310. The mating ends 330 extend forward of the upper contact holders 250*a* into the contact channels 240. Portions of the mating ends 330 extend into the card slot for interfacing with the module circuit card 540. The signal conductors 292, 294 of each cable 290 are welded to the terminating ends 332 of the corresponding signal contacts 306. The drain wires 296 are welded to the terminating ends 332 of the corresponding ground contacts 308.

Figure 14:
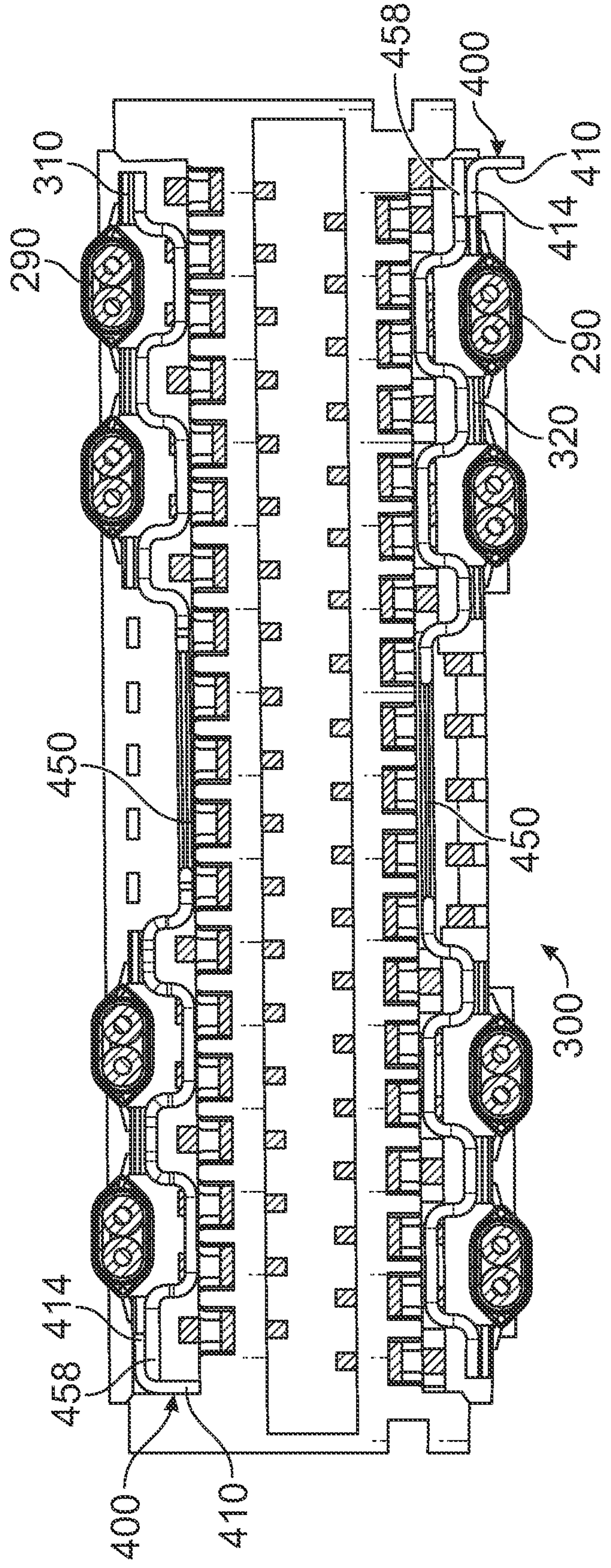
FIG. 14 is a cross-sectional view of a portion of the card edge connector in accordance with an exemplary embodiment.

FIG. 14 is a cross-sectional view of a portion of the card edge connector 112 in accordance with an exemplary embodiment. FIG. 14 shows the cables 290 coupled to the upper and lower contacts 310, 320 of the contact assembly 300. FIG. 14 shows the ground bus bars 450 terminated to the ground contacts 308 of the contact assembly 300. FIG. 14 shows the ground element 400 terminated to the ground bus bar(s) 450. For example, the connecting tabs 416 of the ground plates 410 at opposite sides of the card edge connector 112 may be welded to the connecting pads 458 of the ground bus bars 450.

Figure 15:
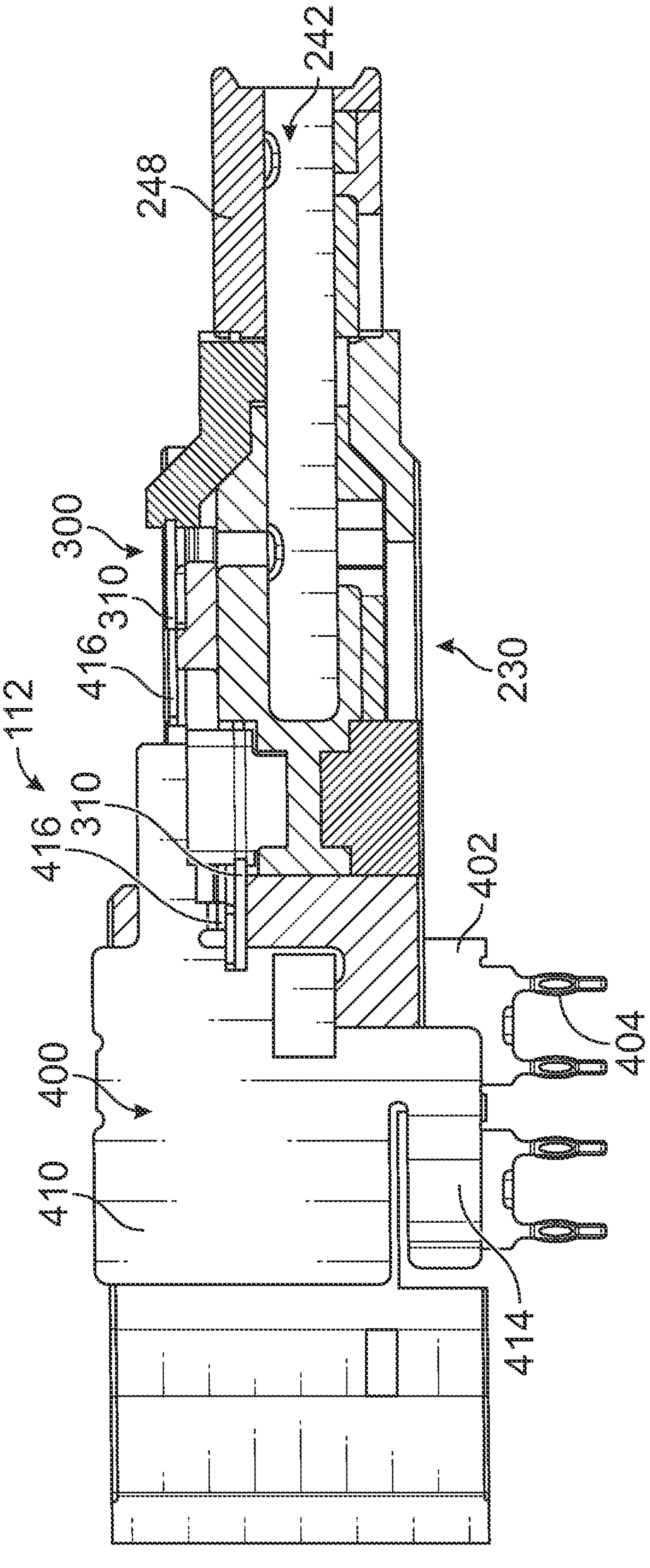
FIG. 15 is a sectional view of a portion of the card edge connector in accordance with an exemplary embodiment.

FIG. 15 is a sectional view of a portion of the card edge connector 112 in accordance with an exemplary embodiment. FIG. 15 shows the contact organizer 230 holding the contact assembly 300 (upper portion of the contact assembly 300 is shown in FIG. 15). FIG. 15 shows the forward and rearward upper contact holders 250*a* holding the forward and rearward sets of upper contacts 310. FIG. 15 shows the ground element 400 held by the contact organizer 230.

The upper contacts 310 are arranged along the top side of the platform 248. In the illustrated embodiment, the upper contacts 310 are arranged in two sets, such as a forward contact set and a rearward contact set. The upper contact holders 250*a* hold the upper contacts 310. The upper contact holders 250*a* are coupled to the contact organizer 230 to locate the upper contacts 310 relative to the contact organizer 230. For example, the upper contact holders 250*a* locate the upper contacts 310 relative to the card slot 242.

The ground plate 410 of the ground element 400 is coupled to the contact organizer 230. The connecting tabs 416 are located near the top of the ground plate 410. The mating tab 414 is located near the bottom of the ground plate 410. The mating tab 414 is mated to the ground plate 402 and spring biased against the ground plate 402 to maintain a mechanical and electrical connection with the ground plate 402. Other types of connecting features may be used in alternative embodiments to create an electrical connection between the ground plate 410 and the ground plate 402. In other various embodiments, the ground plate 402 may be integral with the ground plate 410, such as being stamped and formed from a single sheet of sheet metal. In such embodiments, the ground plate 402 may be loaded into and removable from the outer housing 226 with the contact organizer 230. The ground plate 402 includes board termination components 404 configured to be terminated to the host circuit board 102. The ground element 400 forms a ground return path for the card edge connector 112 with the host circuit board 102. The ground return path is defined from the ground bus bars 450, through the connecting tabs 416, through the ground plate 410, through the mating tab 414, through the ground plate 402, and through the board termination components 404 to the host circuit board 102.

Figure 16:
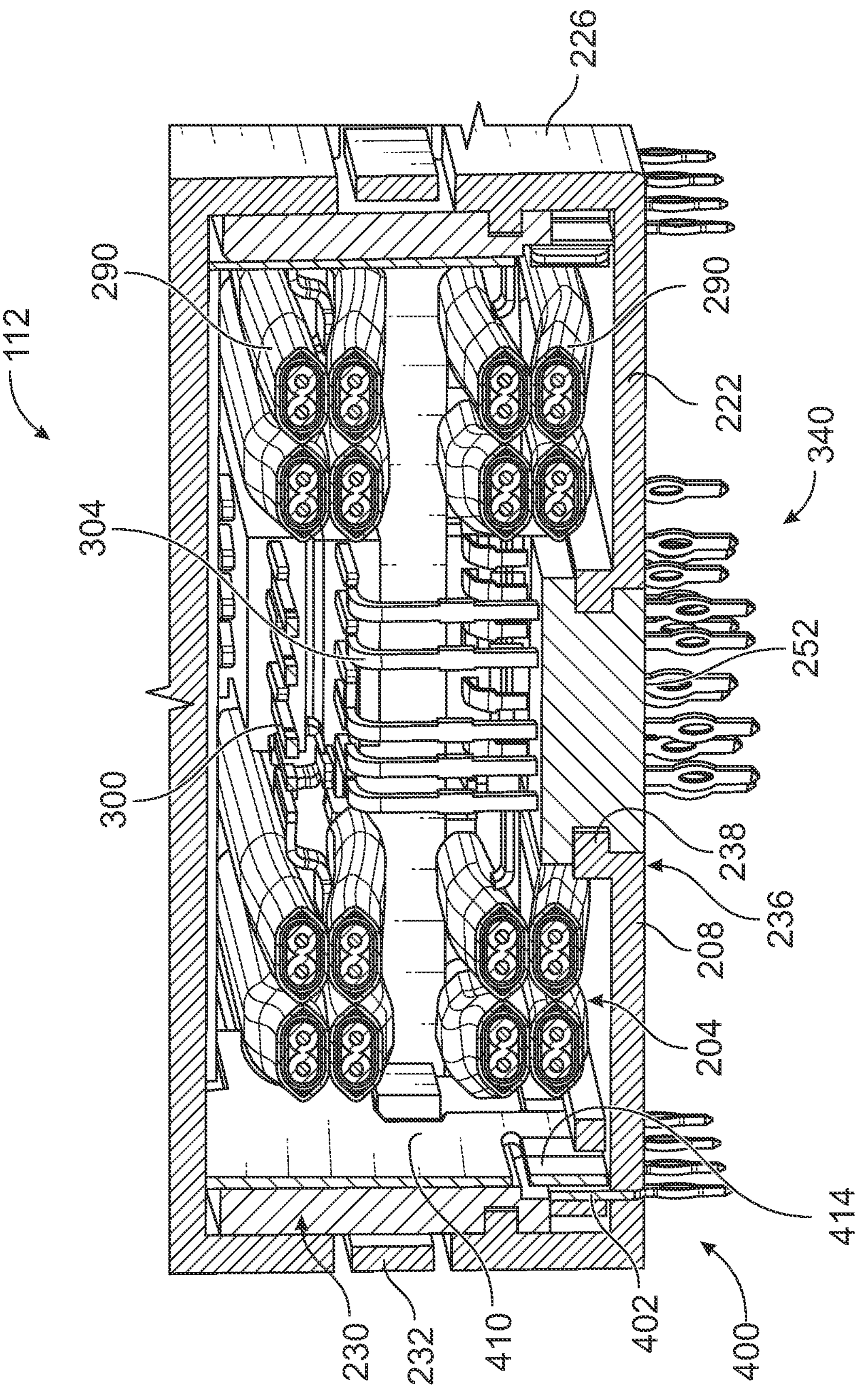
FIG. 16 is a rear perspective view of a portion of the card edge connector in accordance with an exemplary embodiment.

FIG. 16 is a rear perspective view of a portion of the card edge connector 112 in accordance with an exemplary embodiment. The contact organizer 230 holds the contact assembly 300. The contact organizer 230 is loaded into the cavity 204, such as through the rear 208. The latching features 370 of the contact organizer 230 is coupled to the latch 232 of the outer housing 226 to secure the contact organizer 230 in the outer housing 226.

When the contact organizer 230 is loaded into the outer housing 226, the board contacts 304 are held relative to the outer housing 226 for connection to the host circuit board 102. Board contact holders 252 hold the board contacts 304. The board contact holders 252 are coupled to the contact organizer 230 and/or the outer housing 226 to position board terminating ends 340 of the board contacts 304 for connection to the host circuit board 102. In an exemplary embodiment, at least one of the board contact holder 252 is received in the bottom opening 236 in the bottom wall 222 and coupled to the rails 238. The board terminating ends 340 includes compliant pins in the illustrated embodiment, configured to be press-fit into plated vias of the host circuit board 102.

The ground element 400 is provided at both sides of the card edge connector 212 in the illustrated embodiment. Optionally, the portion of the ground element 400 at the left side is configured to be coupled to the upper ground bus bars 450*a* and the portion of the ground element 400 at the right side is configured to be coupled to the lower ground bus bars 450*b*. However, other arrangements are possible in alternative embodiments. In an exemplary embodiment, the ground plate 410 of the ground element 400 is coupled to the contact organizer 230 and the ground plate 402 of the ground element 400 is coupled to the outer housing 226. The ground plate 402 extends through the bottom of the outer housing 226 for termination to the host circuit board 102. The mating tab 414 is mated to the ground plate 402 and spring biased against the ground plate 402 to maintain a mechanical and electrical connection with the ground plate 402. Other types of connecting features may be used in alternative embodiments to create an electrical connection between the ground plate 410 and the ground plate 402. In other various embodiments, the ground plate 402 may be integral with the ground plate 410, such as being stamped and formed from a single sheet of sheet metal. The ground element 400 forms a ground return path for the card edge connector 112 with the host circuit board 102. The ground element 400 transmits the ground current from the contact assembly 300 to the host circuit board 102, which may reduce the heat of the ground contacts 308 and the cables 290 to improve performance of the system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 30 U.S.C. § 112(f), unless and until such claim limitations expressly use the phrase "means for" followed by a statement of function void of further structure.

What is claimed is:

1. A card edge connector for mating with a pluggable module comprising:

a housing including a top and a bottom, the housing having a front and a rear, the housing having a first side and a second side, the bottom configured to be mounted to a host circuit board, the housing including a cavity, the housing including a card slot at the front of the housing, the card slot configured to receive a card edge of a module circuit card of the pluggable module;

a contact assembly received in the cavity, the contact assembly having a plurality of cable contacts arranged in an upper contact set and lower contact set, the cable contacts including signal contacts arranged in pairs and ground contacts arranged between the pairs of the signal contacts, each cable contact including a mating end and a terminating end, the mating end located in the card slot for mating with the module circuit card, the terminated ends of the signal contacts configured to be terminated to signal conductors of cables;

an upper ground bus bar electrically connected to the terminating ends of each of the ground contacts of the upper contact set and a lower ground bus bar electrically connected to each of the ground contacts of the lower contact set; and a ground element coupled to at least one of the upper ground bus bar and the lower ground bus bar, the ground element including a board termination component configured to be terminated to the host circuit board, the ground element electrically connecting the at least one of the upper ground bus bar and the lower ground bus bar to the host circuit board.

2. The card edge connector of claim 1, wherein the ground element forms a ground return path between the at least one of the upper ground bus bar and the lower ground bus bar and the host circuit board.

3. The card edge connector of claim 1, wherein the ground element includes compliant pins configured to be press-fit into the host circuit board to electrically connect the ground element to the host circuit board.

4. The card edge connector of claim 1, wherein the ground element includes a ground plate and a connecting tab extending from the ground plate, the connector tab being electrically connected to at least one of the upper ground bus bar and the lower ground bus bar.

5. The card edge connector of claim 1, wherein the upper ground bus bar includes upper ground fingers welded to each of the ground contacts of the upper contact set and the lower ground bus bar includes lower ground fingers welded to each of the ground contacts of the lower contact set.

6. The card edge connector of claim 1, wherein the upper ground bus bar spans across each of the pairs of the signal contacts of the upper contact set and is electrically isolated from each of the pairs of the signal contacts of the upper contact set and the lower ground bus bar spans across each of the pairs of the signal contacts of the lower contact set and is electrically isolated from each of the pairs of the signal contacts of the lower contact set.

7. The card edge connector of claim 1, wherein the cables include upper cables electrically connected to the corresponding signal contacts of the upper contact set and lower cables electrically connected to the corresponding signal contacts of the lower contact set.

8. The card edge connector of claim 1, wherein the cables include drain wires, the drain wires being terminated to the terminating ends of the corresponding ground contacts to electrically connect the drain wires to the ground contacts.

9. The card edge connector of claim 1, wherein the signal contacts and the ground contacts of the upper contact set are arranged in two rows including a forward row and a rearward row, and wherein the signal contacts and the ground contacts of the lower contact set are arranged in two rows including a forward row and a rearward row.

10. The card edge connector of claim 1, wherein the contact assembly further comprises board contacts held by the housing, each board contact including a board mating end and a board terminating end, the board mating end located in the card slot for mating with the module circuit card, the board terminating end being terminated to the host circuit board, wherein the board contacts transmit low speed signals between the module circuit card and the host circuit board, and wherein the cable contacts transmit high speed signals between the module circuit card and the cables.

11. The card edge connector of claim 1, wherein the housing includes an outer housing and a contact organizer received in the outer housing, the contact organizer holding the contact assembly in the outer housing.

12. The card edge connector of claim 11, wherein the contact organizer includes an upper wall and a lower wall, the signal contacts and the ground contacts of the upper contact set being held by the upper wall above the card slot, the signal contacts and the ground contacts of the lower contact set being held by the lower wall below the card slot.

13. The card edge connector of claim 11, wherein the housing further comprises an upper contact positioner and a lower contact positioner, the upper contact positioner holding the signal contacts and the ground contacts of the upper contact set, the lower contact positioner holding the signal contacts and the ground contacts of the lower contact set, the upper contact positioner positioned in the contact organizer to position the upper contact set in the contact organizer, the lower contact position positioned in the contact organizer to position the lower contact set in the contact organizer.

14. The card edge connector of claim 11, wherein the ground element includes a first ground plate and a second ground plate, the first ground plate held by the contact organizer, the first ground plate being coupled to at least one of the upper ground bus bar and the lower ground bus bar, the second ground plate held by the outer housing, the second ground plate configured to be coupled to the host circuit board, the first ground plate coupled to the second ground plate at a separable mating interface.

15. The card edge connector of claim 1, wherein the ground element is an upper ground element coupled to the upper ground bus bar and extending along the first side of the housing, the card edge connector further comprising a lower ground element coupled to the lower ground bus bar and extending along the second side of the housing, the lower ground element including a board termination component configured to be terminated to the host circuit board, the lower ground element electrically connecting the lower ground bus bar to the host circuit board.

16. A card edge connector for mating with a pluggable module comprising:

a housing including a top and a bottom, the housing having a front and a rear, the housing having a first side and a second side, the bottom configured to be mounted to a host circuit board, the housing including a cavity, the housing including a card slot at the front of the housing, the card slot configured to receive a card edge of a module circuit card of the pluggable module;

a contact assembly received in the cavity, the contact assembly having a plurality of cable contacts and a plurality of board contacts, the cable contacts arranged in an upper contact set and lower contact set, the cable contacts including signal contacts arranged in pairs and ground contacts arranged between the pairs of the signal contacts, each cable contact including a mating end and a terminating end, the mating end located in the card slot for mating with the module circuit card, the terminated ends of the signal contacts configured to be terminated to signal conductors of cables, each board contact including a board mating end and a board terminating end, the board mating end located in the card slot for mating with the module circuit card, the board terminating end being terminated to the host circuit board, wherein the board contacts transmit low speed signals between the module circuit card and the host circuit board, and wherein the cable contacts transmit high speed signals between the module circuit card and the cables;

an upper ground bus bar electrically connected to the terminating ends of each of the ground contacts of the upper contact set and a lower ground bus bar electrically connected to each of the ground contacts of the lower contact set; and a ground element coupled to at least one of the upper ground bus bar and the lower ground bus bar, the ground element including a board termination component configured to be terminated to the host circuit board, the ground element electrically connecting the at least one of the upper ground bus bar and the lower ground bus bar to the host circuit board.

17. The card edge connector of claim 16, wherein the ground element forms a ground return path between the at least one of the upper ground bus bar and the lower ground bus bar and the host circuit board.

18. The card edge connector of claim 16, wherein the signal contacts and the ground contacts of the upper contact set are arranged in two rows including a forward row and a rearward row, and wherein the signal contacts and the ground contacts of the lower contact set are arranged in two rows including a forward row and a rearward row.

19. The card edge connector of claim 16, wherein the housing includes an outer housing and a contact organizer received in the outer housing, the contact organizer holding the contact assembly in the outer housing, the contact organizer including an upper wall and a lower wall, the signal contacts and the ground contacts of the upper contact set being held by the upper wall above the card slot, the signal contacts and the ground contacts of the lower contact set being held by the lower wall below the card slot.

20. A communication system comprising:

a host circuit board having a board surface and a mounting area on the board surface, the host circuit board including board circuits at the mounting area; and a card edge connector mounted to the host circuit board at the mounting area, the card edge connector comprising:

a housing including a top and a bottom, the housing having a front and a rear, the housing having a first side and a second side, the bottom mounted to the board surface of the host circuit board, the housing including a cavity, the housing including a card slot at the front of the housing, the card slot configured to receive a card edge of a module circuit card of a pluggable module;

a contact assembly received in the cavity, the contact assembly having a plurality of cable contacts and a plurality of board contacts, the cable contacts arranged in an upper contact set and lower contact set, the cable contacts including signal contacts arranged in pairs and ground contacts arranged between the pairs of the signal contacts, each cable contact including a mating end and a terminating end, the mating end located in the card slot for mating with the module circuit card, the terminated ends of the signal contacts configured to be terminated to signal conductors of cables, each board contact including a mating end and a board terminating end, the mating end located in the card slot for mating with the module circuit card, the board terminating end being terminated to a corresponding one of the board circuits of the host circuit board, wherein the board contacts transmit low speed signals between the module circuit card and the host circuit board, and wherein the cable contacts transmit high speed signals between the module circuit card and the cables;

an upper ground bus bar electrically connected to the terminating ends of each of the ground contacts of the upper contact set and a lower ground bus bar electrically connected to each of the ground contacts of the lower contact set; and a ground element coupled to at least one of the upper ground bus bar and the lower ground bus bar, the ground element including a board termination component terminated to the host circuit board at the mounting area, the ground element electrically connecting the at least one of the upper ground bus bar and the lower ground bus bar to the host circuit board.

* * * * *